United States Patent [19]

Iida

[11] Patent Number: 5,517,417
[45] Date of Patent: May 14, 1996

[54] DIFFERENTIAL LIMIT TORQUE CONTROL APPARATUS

[75] Inventor: Hiroki Iida, Yokohama, Japan

[73] Assignee: Nissan Motor Co., Ltd., Yokohama, Japan

[21] Appl. No.: 197,520

[22] Filed: Feb. 16, 1994

[30] Foreign Application Priority Data

Feb. 18, 1993 [JP] Japan .................................. 5-028823

[51] Int. Cl.$^6$ ............................................ B60K 17/16
[52] U.S. Cl. ............... 364/426.01; 180/197; 364/426.02; 364/426.03
[58] Field of Search ................... 364/426.01, 426.02, 364/426.03; 180/197, 248, 245

[56] References Cited

U.S. PATENT DOCUMENTS

| | | | |
|---|---|---|---|
| 4,953,654 | 9/1990 | Imaseki et al. | 180/197 |
| 5,183,131 | 2/1993 | Naito | 180/233 |
| 5,332,059 | 7/1994 | Shirakawa et al. | 180/197 |

FOREIGN PATENT DOCUMENTS 63-222937  9/1988  Japan.

*Primary Examiner*—Michael Zanelli
*Attorney, Agent, or Firm*—Lowe, Price, LeBlanc & Becker

[57] ABSTRACT

An apparatus for controlling a differential limit torque produced in a differential provided in an automotive vehicle. During vehicle deceleration, a required differential limit torque value is calculated based on the vehicle deceleration. When a decrease is detected in the required differential limit torque value, a target value for the differential limit torque is calculated based on the required differential limit torque value through a filtering process employing a first filter having a slow output response with respect to the required differential limit torque value decrease in the presence of vehicle braking or a second filter having a fast output response with respect to the required differential limit torque value decrease in the absence of vehicle braking. The differential limit torque is controlled to the calculated target value.

4 Claims, 4 Drawing Sheets

DIFFERENTIAL LIMIT TORQUE CONTROL APPARATUS

FIELD OF THE INVENTION

This invention relates to an apparatus responsive to vehicle deceleration for controlling a differential limit torque produced between vehicle drive road wheels.

BACKGROUND OF THE RELATED ART

Japanese Patent Kokai No. 56-222937, for example, discloses a differential limit torque control apparatus for use with an automotive vehicle. The differential limit torque control apparatus is arranged to prevent the vehicle from deflecting because of spin and/or wheel lock on a road surface having a low friction coefficient by providing a differential limit torque when the left and right drive wheel speed difference exceeds a predetermined value in the presence of vehicle braking. However, such a conventional differential limit torque control apparatus has no ability to ensure stability vehicle turning operation during vehicle deceleration by providing a differential limit torque to produce a moment about the center of gravity of the vehicle in the understeer direction.

SUMMARY OF THE INVENTION

It is an object of the invention to provide a differential limit torque control apparatus which can ensure good stability during vehicle turning operation in the presence of vehicle braking.

Another object of the invention is to provide a differential limit torque control apparatus which can prevent a sudden vehicle behavior change resulting from a sudden torque increase during vehicle turning operation in the presence of vehicle braking.

Another object of the invention is to provide a differential limit torque control apparatus which can improve the ability to control the vehicle during vehicle turning operation in the presence of vehicle braking.

Still another object of the invention is to provide a differential limit torque control apparatus which can improve the steering performance in the latter stage of vehicle turning operation.

There is provided, in accordance with the invention, a differential limit torque control apparatus for use with an automotive vehicle having at least one pair of drive road wheels. The differential limit torque control apparatus comprises means provided between the drive road wheels for producing a differential limit torque, means responsive to vehicle deceleration for calculating a required differential limit torque value corresponding to the vehicle deceleration, means responsive to a decrease in the required differential limit torque value for selecting a first filter having a slow output response with respect to the required differential limit torque value decrease in the presence of vehicle braking and a second filter having a fast output response with respect to the required differential limit torque value decrease in the absence of vehicle braking, means for calculating a target value for the differential limit torque through a filtering process using the selected one of the first and second filters and the required differential limit torque value, and means for controlling the differential limit torque producing means to adjust the produced differential limit torque to the target value.

BRIEF DESCRIPTION OF THE DRAWINGS

This invention will be described in greater detail by reference to the following description taken in connection with the accompanying drawings, in which.

DETAILED DESCRIPTION OF THE PREFERRED EMBODIMENTS

Figure 1:
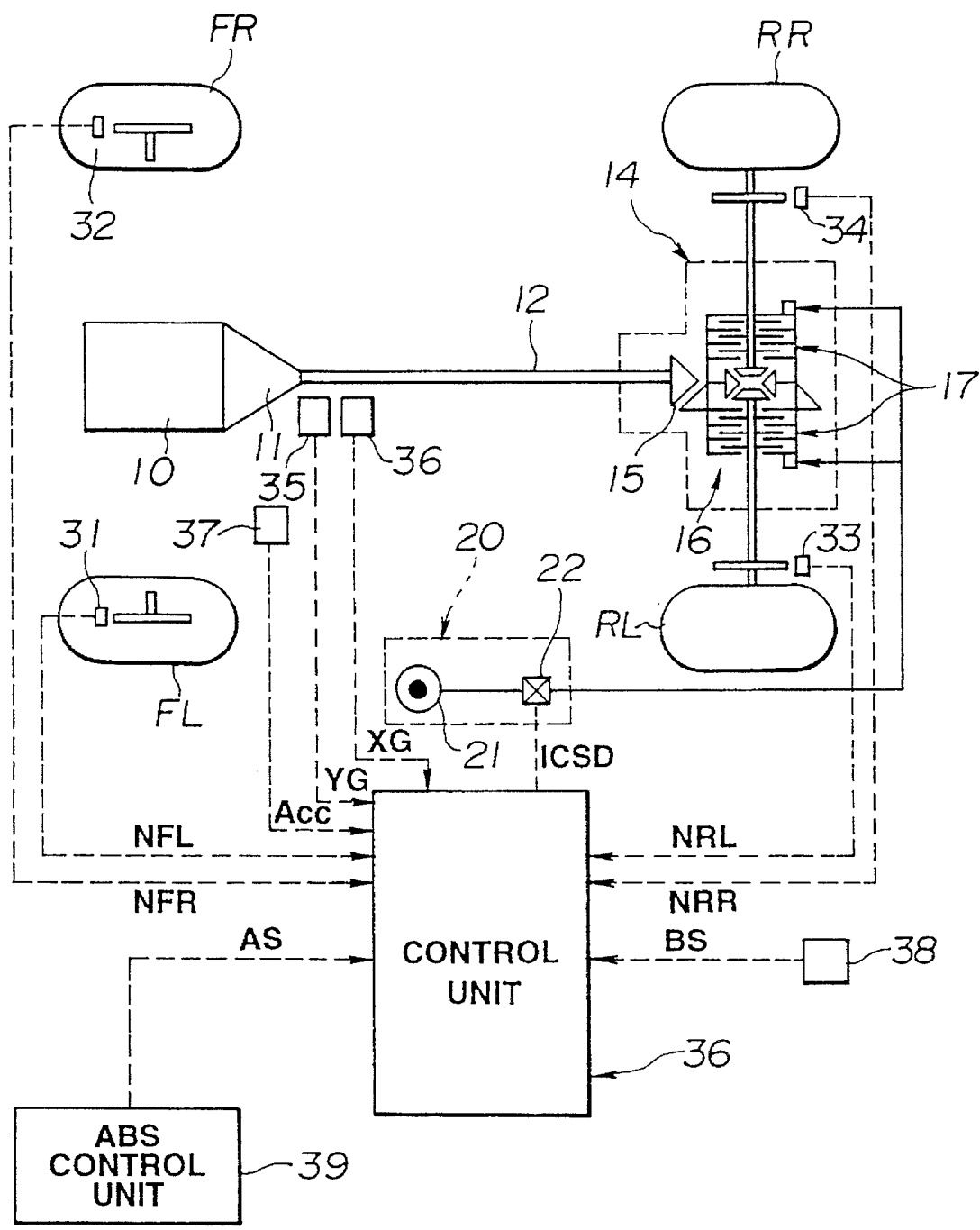
FIG. 1 is a schematic diagram showing one embodiment of a differential limit torque control apparatus made in accordance with the invention.

With reference to the drawings, and in particular to FIG. 1, there is shown a schematic diagram of a differential limit torque control apparatus embodying the invention. The invention will be described in connection with a rear wheel driven automotive vehicle supported on a pair of front road wheels FL and FR and a pair of rear road wheels EL and RR. The automotive vehicle includes an internal combustion engine 10 from which the drive is transmitted through a transmission 11 to a propeller shaft 12. It is then taken by a final drive unit 14 which contains a final drive 15 and a differential 16. The final drive 15 turns the drive round through 90 degrees and reduces the speed in a selected ratio. The differential 16 divides the drive equally between the two output shaft which are connected through the universal joints to the respective rear road wheels RL and RR. The differential 16 is taken in the form of a limited slip differential (LSD) including a differential limit clutch 17 which receives a clutch control pressure from a pressure control unit 20 and produces a differential limit torque corresponding to the clutch control pressure between the rear road wheels RL and RR. The pressure control unit 20 includes an source 21 of pressurized oil and a pressure control valve 22. The control valve 22 operates on a command from a control unit 36 to control the clutch control pressure applied to the differential limit clutch 17.

The clutch control pressure is repetitively determined from calculations performed based upon various conditions of the automotive vehicle that are sensed during its operation. These sensed conditions include left front road wheel rotational frequency NFL, right front road wheel rotational frequency NFR, left rear road wheel rotational frequency NRL, right rear road wheel rotational frequency NRR, lateral acceleration YG, longitudinal acceleration XG, and accelerator pedal position Acc. Thus, a left front road wheel rotational frequency sensor 31, a right front road wheel rotational frequency sensor 32, a left rear road wheel rotational frequency sensor 33, a right rear road wheel rotational frequency sensor 34, a lateral acceleration sensor 35, a longitudinal acceleration sensor 36 and an accelerator pedal position sensor 37 are connected to the control unit 36. The control unit also receives a switch signal BS from a brake switch 38 and an ABS operation command signal AS from an ABS control unit 39.

The left front road wheel rotational frequency sensor 31 is positioned to produce a signal indicative of the frequency NFL of rotation of the left front road wheel FL. The right front road wheel rotational frequency sensor 32 is positioned to produce a signal indicative of the frequency NFR of rotation of the right front road wheel FR. The left rear road wheel rotational frequency sensor 33 is positioned to produce a signal indicative of the frequency NRL of rotation of the left rear road wheel RL. The right rear road wheel rotational frequency sensor 34 is positioned to produce a signal indicative of the frequency. NEE of rotation of the right rear road wheel RR. The lateral acceleration sensor. 35 is provided to produce a signal indicative of the lateral acceleration YG of the vehicle. The longitudinal acceleration sensor 36 is provided to produce a signal indicative of the longitudinal acceleration XG of the vehicle. The accelerator position sensor 37 is associated to the accelerator pedal to produce a signal indicative of the degree ACC to which the accelerator pedal is depressed. The brake switch 38 is associated with the brake pedal to produce the switch signal BS in the presence of vehicle braking.

The control unit 36 comprises a digital computer which includes a central processing unit (CPU), a random access memory (RAM), a read only memory (ROM) and an input/output control unit (I/O). The central processing unit communicates with the rest of the computer via data bus. The input/output control unit includes an analog-to-digital converter which receives analog signals from the various sensors and converts them into digital form for application to the central processing unit. The read only memory contains the program for operating the central processing unit and further contains appropriate data in look-up tables used in calculating an appropriate value for the control signal ISCD. A control word specifying a desired control signal value is periodically transferred by the central processing unit to the control circuit included in the input/output control unit. The control circuit converts the received control word into a control signal ICSD for application to the control valve 22. The control valve 22 connects the pressurized oil source 21 to the differential limit clutch 17 at a duty ratio determined by the duty factor of the control signal ICSD.

Figure 2:
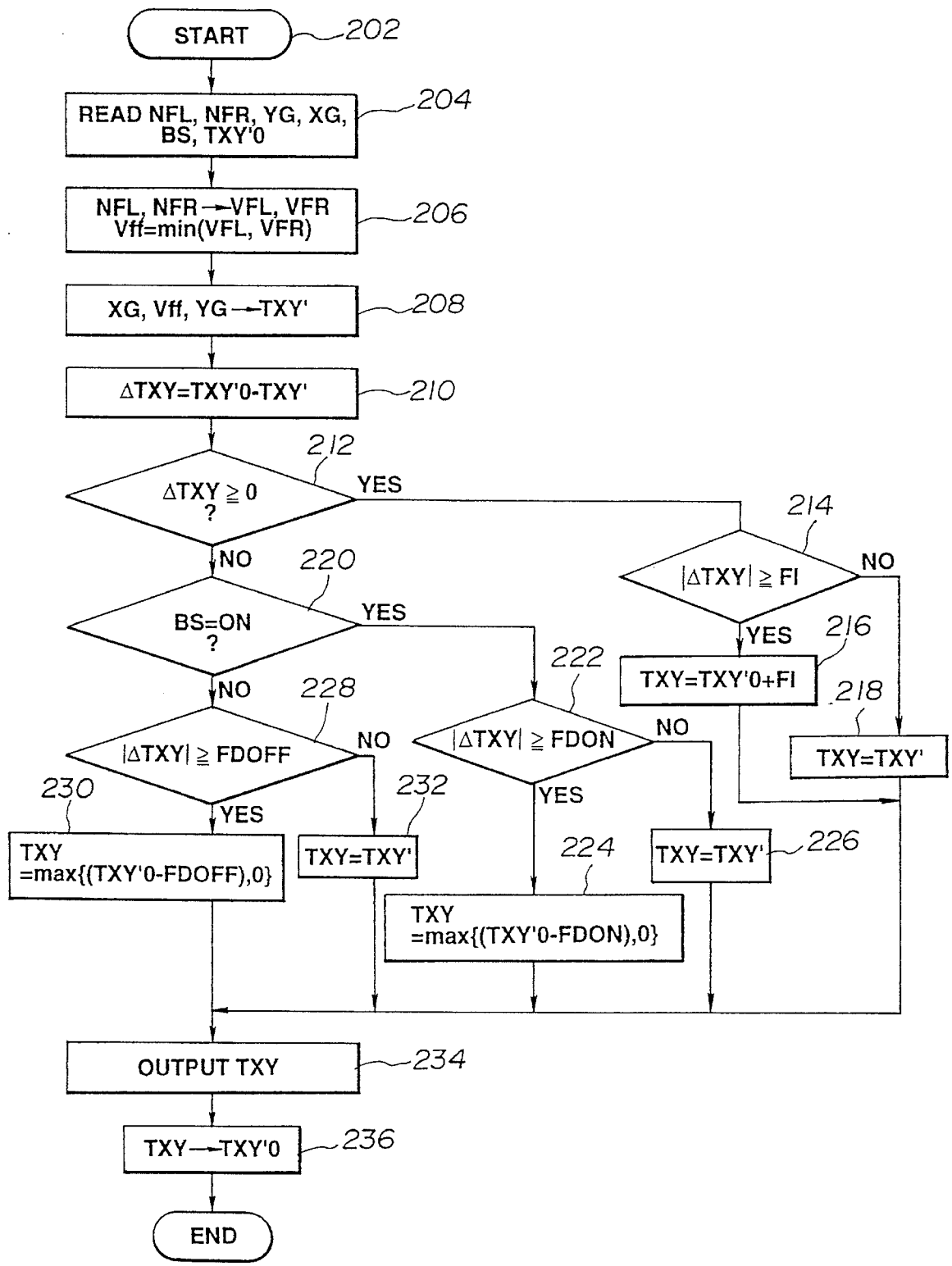
FIG. 2 is a flow diagram illustrating the programming of the digital computer used in the differential limit torque control apparatus.
Figure 3:
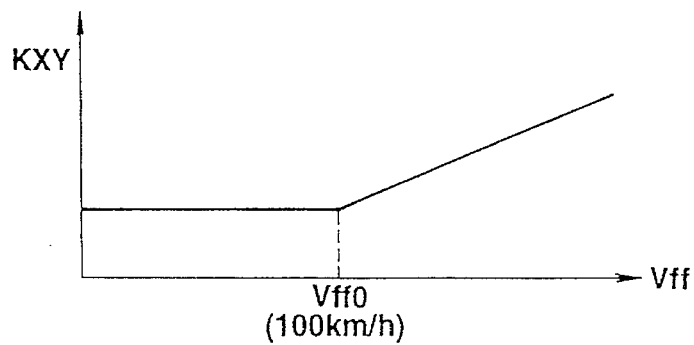
FIGS. 3, 4 and 5 are graphs used in explaining the manner where a required differential limit torque value is calculated.
Figure 4:
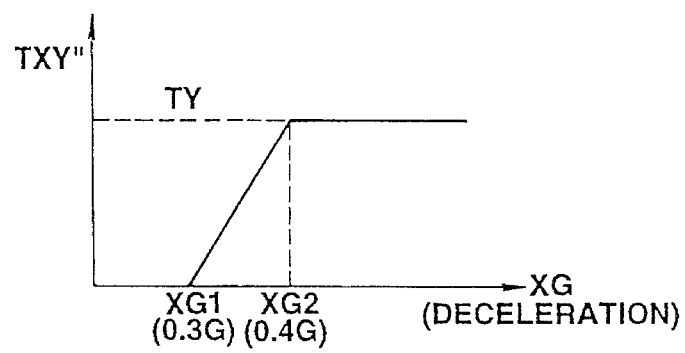
Figure 5:
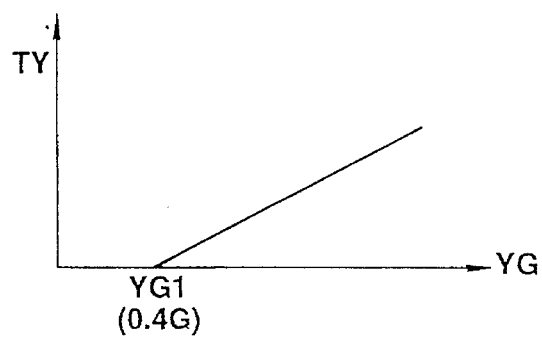

FIG. 2 is a flow diagram illustrating the programming of the digital computer as it is used to calculate a desired value for the control signal ICSD. The computer program is entered at the point 202 at uniform time intervals, for example, of 10 msec. At the point 204 in the program, the left front road wheel rotational frequency NFL, the right front road wheel rotational frequency NFR, the lateral acceleration YG, longitudinal acceleration XG, the switch signal BS, and the last value of the target longitudinal-G, lateral-G responsive torque TXY'O are read in to the computer memory. The last value TXY'O of the target longitudinal-G, lateral-G responsive torque is the target longitudinal-G, lateral-G responsive torque TXY calculated in the last cycle of execution of this program. At the point 206 in the program, the left and right front road wheel rotational frequency NFL and NFR are used for the left and right front road wheel speeds VFL and VFR and the smaller one of the left and right front road wheel speeds VFL and VFR is selected for the vehicle speed Vff. At the point 208 in the program, a required longitudinal-G, lateral-G responsive torque value TXY' (a differential limit torque to be provided during deceleration) is calculated as a function of longitudinal acceleration XG, the lateral acceleration YG and the vehicle speed Vff. This longitudinal-G, lateral-G responsive torque TXY' may be calculated as:

$$TXY'=KXY \cdot TXY''$$

where KXY is the gain corresponding to the vehicle speed Vff and TXY" is a longitudinal-G, lateral-G responsive torque. This gain KXY is constant when the vehicle speed Vff is equal to or less than a predetermined value VffO (for example, 100 km/h) and it increases as the vehicle speed Vff increases when the vehicle speed Vff exceeds the predetermined value VffO, as shown in FIG. 3. This longitudinal-G, lateral-G responsive torque TXY" increases when the longitudinal acceleration XG has a negative value (deceleration) ranging from a first predetermined value XG1 (for example, 0.3G) to a second predetermined value XG2 (for example, 0.4G) and it is equal to a lateral acceleration responsive torque TY, as shown in FIG. 4. This lateral acceleration responsive torque TY increases in direct proportion to the lateral acceleration YG when the lateral acceleration YG exceeds a predetermined value (for example, 0.4G), as shown in FIG. 5. At the point 210 in the program, a longitudinal-G, lateral-G responsive torque change ΔTXY is calculated by subtracting the required longitudinal-G, lateral-G responsive torque value TXY' calculated at the point 208 from the last longitudinal-G, lateral-G responsive torque value TXY'O read at the point 204.

At the point 212 in the program, a determination is made as to whether or not the calculated longitudinal-G, lateral-G responsive torque change ΔTXY is equal to or greater than zero. If the answer to this question is "yes", then it means that the longitudinal-G, lateral-G responsive torque changes in an increasing direction and the program proceeds to another determination step at the point 214. This determination is as to whether or not the absolute value |ΔTXY| of the calculated longitudinal-G, lateral-G responsive torque change ΔTXY is equal to or greater than a first predetermined filter value F1 (for example, 0.375 kgm/10 msec) set for the longitudinal-G, lateral-G responsive torque changing in an increasing direction. If the answer to this question is "yes" then the program proceeds to the point 216 where a target longitudinal-G, lateral-G responsive torque value TXY is calculated by adding the first filter value F1 to the last value TXY'O of the target longitudinal-G, lateral-G responsive torque. Following this, the program proceeds to the point 234. If the answer to the question inputted at the point 214 is "no", then the program proceeds to the point 218 where the target longitudinal-G, lateral-G responsive torque TXY is set at the required longitudinal-G, lateral-G responsive torque value TXY' calculated at the point 208. Following this, the program proceeds to the point 234 where the target longitudinal-G, lateral-G responsive torque value TXY is outputted to the control circuit included in the input/output control unit which converts it into a control current ICSD so as to provide a differential limit torque corresponding to the target longitudinal-G, lateral-G responsive torque value TXY in the differential limit clutch 17.

If the answer to the question inputted at the point 212 is "no", then the program proceeds to the point 220 where a determination is made as to whether or not braking is applied to the vehicle. This determination is made based on the switch signal BS. If the answer to this question is "yes", then the program proceeds to another determination step at the point 222. This determination is as to whether or not the absolute value |ΔTXY| of the calculated longitudinal-G, lateral-G responsive torque change ΔTXY is equal to or greater than a second filter value FDON (for example, 0.375 kgm/10 sec) set for the longitudinal-G, lateral-G responsive torque changing in a decreasing direction in the presence of vehicle braking. If the answer to this question is "yes", then the program proceeds to the point 224 where the target longitudinal-G, lateral-G responsive torque value TXY is calculated by subtracting the second filter value FDON from the last value TXY'O of the target longitudinal-G, lateral-G responsive torque when this calculated difference is greater than zero. If the difference is equal to or less than zero, the target longitudinal-G, lateral-G responsive torque TXY is set at zero. Following this, the program proceeds to the point 234 where the target longitudinal-G, lateral-G responsive torque value TXY is outputted to the control circuit included in the input/output control unit which converts it into a control current ICSD so as to provide a differential limit torque corresponding to the target longitudinal-G, lateral-G responsive torque value TXY in the differential limit clutch 17. If the answer to the question inputted at the point 222 is "no" then the program proceeds to the point 226 where the target longitudinal-G, lateral-G responsive torque TXY is set at the required longitudinal-G, lateral-G responsive torque value TXY' calculated at the point 208. Following this, the program proceeds to the point 234 where the target longitudinal-G, lateral-G responsive torque value TXY is outputted to the control circuit included in the input/output control unit which converts it into a control current ICSD so as to provide a differential limit torque corresponding to the target longitudinal-G, lateral-G responsive torque value TXY in the differential limit clutch 17.

If the answer to the question inputted at the point 220 is "no" then it means the absence of vehicle braking and the program proceeds to another determination step at the point 228. This determination is as to whether or not the absolute value |ΔTXY| of the longitudinal-G, lateral-G responsive torque change ΔTXY is equal to or greater than a third filter value FDOFF (for example, 5.0 kgm/10 msec) set for the longitudinal-G, lateral-G responsive torque changing in a decreasing direction in the absence of vehicle braking. If the answer to this question is "yes" then the program proceeds to the point 230 where the target longitudinal-G, lateral-G responsive torque value TXY is calculated by subtracting the third filter value FDOFF from the last value TXY'O of the target longitudinal-G, lateral-G responsive torque when this calculated difference is greater than zero. If the difference is equal to or less than zero, the target longitudinal-G, lateral-G responsive torque TXY is set at zero. Following this, the program proceeds to the point 234 where the target longitudinal-G, lateral-G responsive torque value TXY is outputted to the control circuit included in the input/output control unit which converts it into a control current ICSD so as to provide a differential limit torque corresponding to the target longitudinal-G, lateral-G responsive torque value TXY in the differential limit clutch 17. If the answer to the question inputted at the point 228 is "no" then the program proceeds to the point 232 where the target longitudinal-G, lateral-G responsive torque TXY is set at the required longitudinal-G, lateral-G responsive torque value TXY' calculated at the point 208. Following this, the program proceeds to the .point 234 where the target longitudinal-G, lateral-G responsive torque value TXY is outputted to the control circuit included in the input/output control unit which converts it into a control current ICSD so as to provide a differential limit torque corresponding to the target longitudinal-G, lateral-G responsive torque value TXY in the differential limit clutch 17. At the point 236 in the program, the target longitudinal-G, lateral-G responsive torque value TXY is stored to update the last value TXY'O therefor in the computer memory. Following this, the program proceeds to the end point 238.

The operation of the differential limit torque control apparatus of the invention will be described further. When the longitudinal-G, lateral-G responsive torque increases during vehicle turning operation at the initial and middle stages of vehicle braking, the target longitudinal-G, lateral-G responsive torque TXY is calculated through a filtering process of adding the first filter value F1 to the last value TXY'O of the target longitudinal-G, lateral-G responsive torque TXY calculated before a predetermined time (for example, 10 msec). As a result, the produced differential limit torque increases as the longitudinal deceleration XG increases and the lateral acceleration YG increases in the presence of vehicle braking during vehicle turning operation. It is, therefore, possible to ensure good stability during vehicle turning operation in the presence of vehicle braking. Since the first filter value F1 provides a great filtering effect and suppresses the rate of increase of the differential limit torque. This is effective to prevent a sudden vehicle behavior change resulting from a sudden torque increase and improve the ability to control the vehicle during vehicle turning operation in the presence of vehicle braking.

Figure 6:
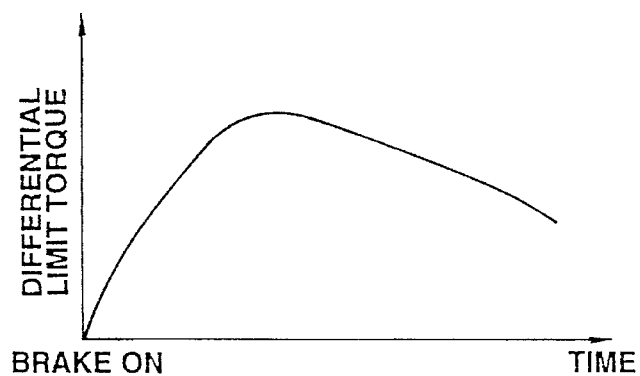
FIG. 6 is a graph used in explaining the operation of the differential limit torque control apparatus during vehicle turning operation in the presence of vehicle braking.

When the longitudinal-G, lateral-G responsive torque decreases at the latter stage of vehicle braking during vehicle turning operation, the target longitudinal-G, lateral-G responsive torque TXY is calculated through a filtering process of subtracting the second filter value FDON from the last value TXY'O of the target longitudinal-G, lateral-G responsive torque TXY calculated before a predetermined time (for example, 10 msec). At the latter stage of vehicle braking during vehicle turning operation, the second filter value FDON, which provides a great filtering effect, suppresses the rate of decrease of the produced differential limit torque so as to leave the differential limit torque. In other words, in the presence of vehicle braking, the target differential limit torque value is calculated through a filtering process employing a filter having a fast output response with respect to a differential limit torque change. It is, therefore, possible to ensure good stability during vehicle turning operation in the presence of vehicle braking and also to improve the ability to control the vehicle during vehicle turning operation in the presence of vehicle braking. For example, the differential limit torque will decrease at a gentle rate during vehicle turning operation in the presence of vehicle braking, as shown in FIG. 6.

Figure 7:
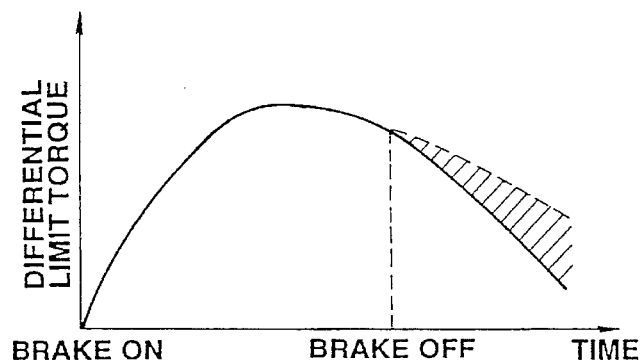
FIG. 7 is a graph used in explaining the operation of the differential limit torque control apparatus during vehicle turning operation in the absence of vehicle braking.

When the longitudinal-G, lateral-G responsive torque decreases at the latter stage of vehicle turning operation with the brake being released, the target longitudinal-G, lateral-G responsive torque TXY is calculated through a filtering process of subtracting the third filter value FDOFF from the last value TXY'O of the target longitudinal-G, lateral-G responsive torque TXY calculated before a predetermined time (for example, 10 msec). At the latter stage of vehicle turning operation with the brake being released, the third filter value FDOFF, which provides a small filtering effect, decreases the differential limit torque at a great rate so as to reduce the understeer characteristic of the vehicle. In other words, in the absence of vehicle braking, the target differential limit torque value is calculated through a filtering process employing a filter having a fast output response with respect to a differential limit torque change. This is effective to improve the steering performance when the steering wheel rotates further in the latter stage of vehicle turning operation and to improve the steering performance when the accelerator pedal is depressed after the brake is released. For example, the differential limit torque will decrease at a greater rate after the brake is released, as shown in FIG. 7 where the hatched area indicates the understeer reduction effect.

Figure 8:
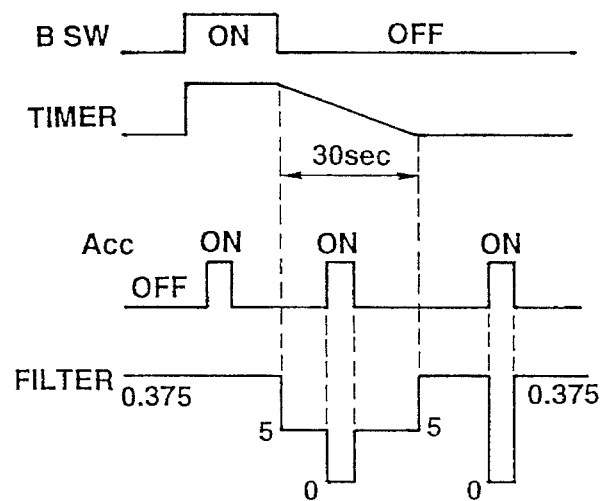
FIG. 8 is a time chart used in explaining the operation of a second embodiment of the differential limit torque control apparatus of the invention.

Referring to FIG. 8, a second embodiment of the differential limit torque control apparatus of the invention will be described. This embodiment is substantially the same as the first embodiment except for that one of the second and third filter values are selected in connection with accelerator pedal operation. In this embodiment, a timer is used to produce first and second level outputs in connection with brake pedal operation. When the brake switch 38 is turned on, the output of the timer changes from the first level to the second level. In the presence of the second level output from the timer, the filtering process employs the second filter value DDON (for example, 0.375 kgm/10 msec) to set the target longitudinal-G, lateral-G responsive torque TXY regardless of whether or not the accelerator pedal is depressed. The timer output remains at the second level as long as the brake switch 38 remains on. When the brake switch 38 is turned off, the timer output changes from the second level gradually toward the first level. For example, the timer output changes from the second level to the first level for a predetermined period of time (in the illustrated case 30 seconds). When the timer output remains between the first and second levels, the filtering process employs the third filter value DDOFF (for example, 0.5 kgm/10 msec) to set the target longitudinal-G, lateral-G responsive torque TXY when the accelerator pedal is not depressed (Acc= OFF). In this case, the third filter value is changed to zero when the accelerator pedal is depressed (Acc= ON). When the timer output changes to the first level, the filtering process employs the second filter value DDON (for example, 0.375 kgm/10 msec) to set the target longitudinal-G, lateral-G responsive torque TXY when the accelerator pedal is not depressed (Acc=OFF). In this case, the second filter value is changed to zero when the accelerator pedal is depressed (Acc=ON).

In this embodiment, the filtering effect is weakened for 30 seconds after the brake switch 38 is turned off. This is effective to improve the steering performance when the steering wheel rotates further in the latter stage of vehicle turning operation and to improve the steering performance when the accelerator pedal is depressed after the brake is released.

While the invention has been described in connection with a multiple-disc clutch provided to produce a desired differential limit torque, it is to be understood that it may be replaced with an electromagnetic clutch or the like operable on an external command to vary the differential limit torque. While the invention has been described in connection with a differential limit torque calculated for deceleration as a function of the longitudinal acceleration XG, the vehicle speed Vff and the lateral acceleration YG, it is to be understood that it may be calculated as a function of longitudinal deceleration XG only.

What is claimed is:

1. A differential limit torque control apparatus for use with an automotive vehicle having at least one pair of drive road wheels, comprising:

means provided between the drive road wheels for producing a differential limit torque;

means for sensing a vehicle deceleration and for calculating a required differential limit torque value corresponding to the vehicle deceleration;

means for sensing a decrease in the required differential limit torque value and for selecting a first filter having a slow output response with respect to the required differential limit torque value decrease in the presence of vehicle braking and a second filter having a fast output response with respect to the required differential limit torque value decrease in the absence of vehicle braking as determined from the sensed vehicle deceleration;

means for calculating a target value for the differential limit torque through a filtering process using the selected one of the first and second filters and the required differential limit torque value; and means for controlling the differential limit torque producing means to adjust the produced differential limit torque to the target value.

2. A differential limit torque control apparatus as claimed in claim 1, further comprising:

means for sensing a vehicle longitudinal acceleration, a vehicle lateral acceleration, and a vehicle speed, wherein the required differential limit torque value calculating means includes means for calculating the required differential limit torque value as a function of the sensed vehicle longitudinal acceleration, vehicle lateral acceleration, and vehicle speed.

3. The differential limit torque control apparatus as claimed in claim 2, wherein:

the required differential limit torque value calculating means includes means for calculating the required differential limit torque value TXY' as TXY'=KXY× TXY" where KXY is a gain which remains at a constant value when the vehicle speed is equal to or less than a first predetermined value and increases as the vehicle speed increases when the vehicle speed exceeds the first predetermined value, and TXY" is a torque which increases the vehicle longitudinal acceleration decreases when the vehicle longitudinal acceleration has a negative value greater than a second predetermined value and remains at a value increasing as the vehicle lateral acceleration increases.

4. The differential limit torque control apparatus as claimed in claim 1, further comprising:

means for sensing accelerator pedal depression, wherein the filter selecting means includes means for selecting the second filter only for a predetermined period of the time after the vehicle braking is released in the absence of a sensed accelerator pedal depression.

\* \* \* \* \*